United States Patent Office 2,939,942
Patented June 7, 1960

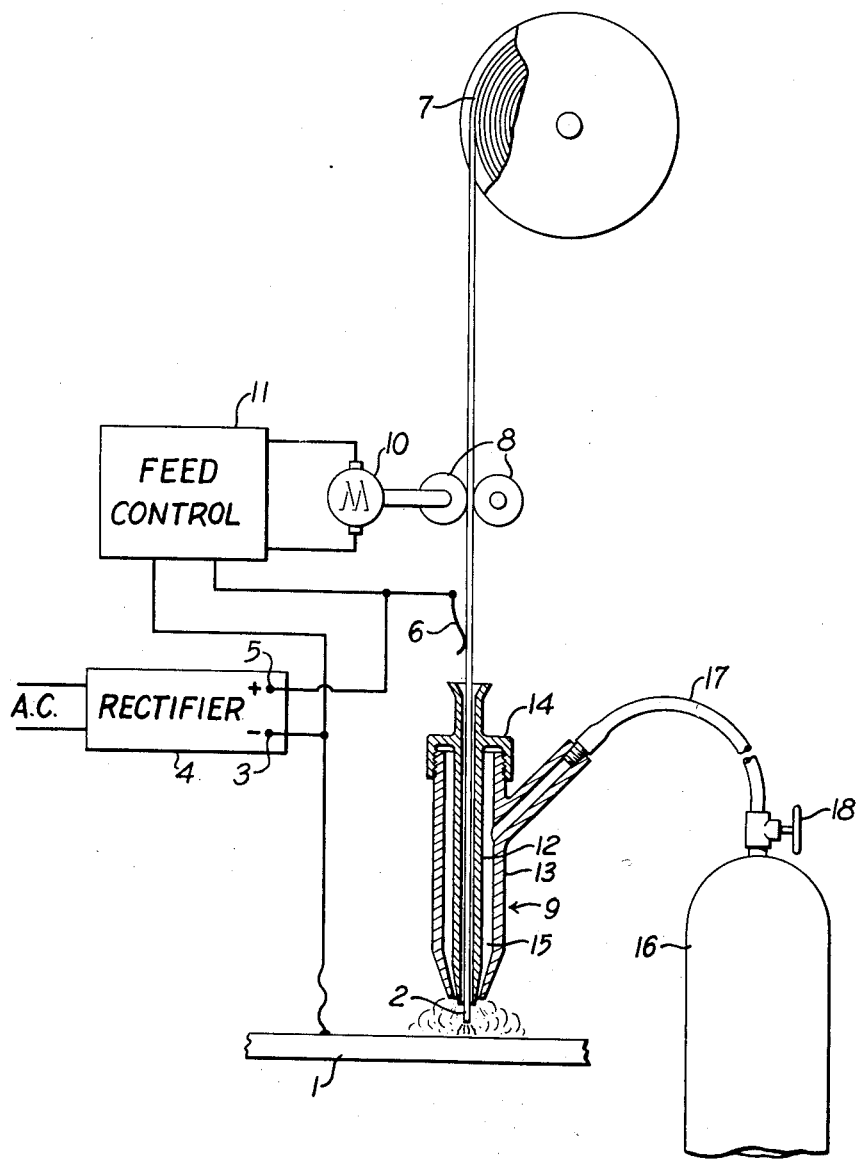

2,939,942

METHOD OF WELDING STAINLESS STEEL

Merrill A. Scheil, Whitefish Bay, Wis., assignor to A. O. Smith Corporation, Milwaukee, Wis., a corporation of New York Filed July 17, 1958, Ser. No. 749,128

5 Claims. (Cl. 219—74)

This invention relates to a method of welding stainless steel and more particularly to a method of introducing a small amount of nitrogen into the stainless steel weld metal during the welding operation.

Recently, it has been discovered that the addition of small amounts of nitrogen to stainless steel provides the steel with increased physical properties at elevated temperatures. The addition of nitrogen to the stainless steel increases the yield strength and rupture strength in the 1000° to 1400° F. range and is beneficial in reducing hot cracking susceptibility. Furthermore, the susceptibility to intergranular corrosion is not as great in high nitrogen stainless steels.

As the addition of nitrogen to stainless steel does produce increased physical properties, particularly at elevated temperatures, it is also desirable to introduce nitrogen into the weld metal joining stainless steel plates to provide the weld metal with corresponding improved properties at elevated temperatures. To provide the weld metal with the desired nitrogen content, high nitrogen, stainless steel electrodes or core wires have been used and these core wires are expensive and can be made generally in large heats.

The present invention is directed to a simple and inexpensive method of introducing nitrogen into the weld metal. According to the invention, the high nitrogen stainless steel base member is welded with a stainless steel electrode in a shielding atmosphere consisting of nitrogen and an inert gas. The nitrogen comprises between 10% and 50% of the shielding mixture with the balance being an inert gas, such as argon or helium. Carbon dioxide, while not generally considered an inert gas, can also be used in combination with the inert gas or as a substitute for the inert gas.

By controlling the amount of nitrogen in the shielding mixture, about 0.15% to 0.25% of nitrogen in the form of nitrides will be formed in the weld metal, and the nitrides thus formed will increase the tensile strength and rupture strength of the weld deposit at elevated temperatures.

The addition of nitrogen to the weld metal also aids in refining the grain of some stainless steels, such as straight chrome stainless.

The drawing furnished herewith illustrates the best mode presently contemplated for carrying out the invention.

Referring to the drawing, there is shown a workpiece 1 to be welded by striking an arc between the workpiece 1 and a stainless steel electrode 2 which may be in wire or rod shape. As shown in the drawing, reverse polarity arc welding is employed with the workpiece 1 connected to the negative terminal 3 of a source of direct current shown as a rectifier 4 and the electrode 2 connected to the positive terminal 5 of the rectifier 4. The connection of the electrode 2 to the electric circuit is by a sliding contact 6 to allow movement of the consumable electrode. As the welding progresses, the portion of the electrode adjacent the workpiece is burned off and transferred to the workpiece 1.

To maintain a predetermined arc length between the electrode and the work, the electrode 2 is continuously drawn from a reel 7 by feed rollers 8 and fed through a welding head 9 toward the workpiece 1. The feed rollers 8 are variably driven by a motor 10 in accordance with the arc length, as hereinafter described. The arc length is maintained practically constant by connecting the arc voltage as a voltage source to an electrode feed control 11 connected to the feed motor 10. If the arc voltage fluctuates, the feed control 11 varies the speed of the feed motor to return the arc length to normal. For example, if the arc length increases above normal, the arc voltage increases and this increased voltage is applied to the feed motor so as to increase the feed of the electrode 2 to the work. Conversely, a decrease in arc length and therefore arc voltage results in a reduction of the feed of electrode 2 and a lengthening of the arc length until a normal arc is obtained. This is a conventional variable electrode feed arrangement and the feed control 11 is therefore shown in diagrammatic form.

The welding head 9 is constructed with concentric cylinders 12 and 13 with the wire electrode 2 passing through the central cylinder 12. The top of the outer cylinder 13 is sealed to the inner cylinder 12 by a cap 14 welded to the outer surface of the cylinder 12 and is threaded onto the outer cylinder 13 to provide an annular passage 15 between the cylinders 12 and 13. To introduce the shielding gas about the welding arc, a source 16 of gas is connected to the passage 15 by a tube 17. A valve 18 in the tube 17 is employed to regulate the flow of gas to the passage 15. The gas passes through passage 15 and is discharged concentrically of the electrode to envelope the arc and thereby protect the welding zone from the surrounding atmosphere.

The base metal or workpiece to be welded can be any of the conventional varieties of stainless steel, such as the AISI type 200, 300 or 400 series of stainless steels.

Specific examples of stainless steel compositions which can be welded with the method of the invention are as follows in weight percent:

| Composition | AISI Type | | | | | | |
|---|---|---|---|---|---|---|---|
| | 201 | 202 | 304L | 347 | 405 | 446 | 410 |
| C | .15 max | .15 max | .03 max | .08 max | .08 max | .20 max | .15 max. |
| Mn | 5.5–7.5 | 7.5–10.0 | 2.0 max | 2.0 max | 1.0 max | 1.5 max | 1.0 max. |
| P | .06 max | .06 max | .045 max | .045 max | .04 max | .04 max | .04 max. |
| S | .03 max | .03 max | .03 max | .03 max | .03 max | .03 max | .03 max. |
| Si | 1.0 max | 1.0 max | 1.0 max | 1.0 max | 1.0 max | 1.0 max | 1.0 max. |
| Cr | 16.0–18.0 | 17.0–19.0 | 18.0–20.0 | 17.0–19.0 | 11.5–14.5 | 23.0–27.0 | 11.5–13.5. |
| Ni | 3.5–5.5 | 4.0–6.0 | 8.0–12.0 | 9.0–13.0 | | | |
| N | .25 max | .25 max | .25 max | .25 max | .25 max | .25 max | .25 max. |
| Cb–Ta | | | | 10XC min | | | |
| Al | | | | | .10–.30 | | |

The electrode composition to be employed is substantially similar to the base metal to be welded except for the nitrogen content which is generally in the range of 0.03 to 0.05% for commercial stainless steels. The electrode may also contain some ferrite to prevent cracking.

According to the invention, the shielding gas consists of 10% to 50% nitrogen and the balance a substantially inert gas, such as argon or helium. Carbon dioxide, which is usually classed as a slightly oxidizing gas, may be substituted for a portion or all of the argon or helium if desired.

If the nitrogen content in the shielding mixture is below 10%, the resulting nitride formation in the weld metal will be insufficient to bring about the desired increase in physical properties, while if the nitrogen content is above 50%, bleeding of the nitrogen from the weld metal will occur which results in excessive porosity. The use of 10% to 50% of nitrogen in the shielding mixture will generally result in a nitrogen content in the weld metal of about 0.15% to 0.25% and this amount of nitrogen is required to bring about the desired increase in physical properties in the weld metal.

*Example 1*

The edges of a pair of ¼" x 6" x 12" type 308 stainless steel plates were prepared for V-groove welding and a copper back-up strip was employed beneath the V-groove joint.

A 1/16" diameter filler wire of type 308 stainless was used with A. O. Smith Corporation C-Omanual welding equipment and a current of 300 amperes was employed with a welding speed of 17.5 inches per minute.

During the welding, a gas shield was used which consisted of 75 cubic feet per hour of argon and 11.39 cubic feet per hour of nitrogen.

The weld made in this manner was smooth and sound and disclosed only a slight amount of very fine porosity. Chemical analysis of the weld metal revealed an average nitrogen content in the weld of 0.176%.

*Example 2*

The type 308 stainless steel plates were welded in the same manner as in Example 1, except that a gas shield mixture of 75 cubic feet per hour of argon and 22.77 cubic feet per hour of nitrogen was used.

The chemical analysis of the weld metal disclosed an average nitrogen content of 0.173%.

By using the combination of nitrogen and an inert gas in the shields when welding stainless steel, a controlled amount of nitrogen will be introduced into the weld deposit which increases the strength of the weld deposit at elevated temperatures and also aids in refining the grain of some types of stainless steel.

Various modes of carrying out the invention are contemplated as being within the scope of the following claims particularly pointing out and distinctly claiming the subject matter which is regarded as the invention.

I claim:

1. A method of arc welding, comprising establishing an arc between a consumable stainless steel electrode and a stainless steel workpiece, feeding a gaseous medium consisting essentially by volume of 10% to 50% nitrogen and the balance being a substantially inert gas to the arc, and feeding said electrode toward the workpiece at a rate determined by the rate of consumption of the electrode to provide a generally constant arc length.

2. A method of arc welding, comprising establishing an arc between a consumable electrode and a workpiece, said electrode and said workpiece being selected from the group consisting of the 200 type, the 300 type and the 400 type of stainless steel, feeding a gaseous medium consisting essentially of nitrogen and a substantially inert gas to the arc, said nitrogen being of a sufficient volume to provide a nitrogen content in the weld metal of 0.15% to 0.25% by weight, and feeding said electrode toward the workpiece at a rate to provide a generally constant arc length.

3. A method of arc welding, comprising establishing an arc between a consumable stainless steel electrode and a stainless steel workpiece, feeding a gaseous medium to the arc, said gaseous medium consisting essentially by volume of from 10 to 50% nitrogen and the balance being a gas selected from the group consisting of argon, helium, carbon dioxide and mixtures thereof, and feeding said electrode toward the workpiece at a rate to provide a generally constant arc length.

4. A method of arc welding, comprising establishing an arc between a consumable stainless steel electrode and a stainless steel workpiece, said workpiece containing from 0.15 to 0.25% nitrogen to provide increased physical properties at elevated temperatures and said electrode being substantially free of nitrogen, feeding a gaseous medium consisting essentially by volume of 10 to 50% nitrogen and the balance being carbon dioxide to the arc, and feeding said electrode toward the workpiece at a rate to provide a generally constant arc length.

5. A method of arc welding, comprising establishing an arc between a consumable stainless steel electrode and a stainless steel workpiece, said workpiece containing by weight from 0.15 to 0.25% nitrogen to provide increased physical properties at elevated temperatures and said electrode being substantially free of nitrogen, feeding a gaseous medium consisting essentially by volume of 10 to 50% nitrogen and the balance being argon to the arc, and feeding said electrode toward the workpiece at a rate to provide a generally constant arc length.

References Cited in the file of this patent

UNITED STATES PATENTS

| | | |
|---|---|---|
| 1,746,191 | Devers | Feb. 4, 1930 |
| 2,788,429 | Turner et al. | Apr. 9, 1957 |

FOREIGN PATENTS

| | | |
|---|---|---|
| 759,422 | Great Britain | Oct. 17, 1956 |